United States Patent [19]
Okamoto et al.

[11] Patent Number: 5,826,057
[45] Date of Patent: Oct. 20, 1998

[54] METHOD FOR MANAGING VIRTUAL ADDRESS SPACE AT IMPROVED SPACE UTILIZATION EFFICIENCY

[75] Inventors: Toshio Okamoto; Hideo Segawa, both of Tokyo; Mitsuo Saito; Osamu Wakamori, both of Kanagawa-ken, all of Japan

[73] Assignee: Kabushiki Kaisha Toshiba, Kawasaki, Japan

[21] Appl. No.: 5,371

[22] Filed: Jan. 15, 1993

[30] Foreign Application Priority Data

| | | | |
|---|---|---|---|
| Jan. 16, 1992 | [JP] | Japan | 4-005993 |
| Jan. 16, 1992 | [JP] | Japan | 4-005994 |
| Jan. 16, 1992 | [JP] | Japan | 4-026039 |

[51] Int. Cl.$^6$ ................................................ G06F 12/08
[52] U.S. Cl. ...................... 395/500; 711/220; 711/203
[58] Field of Search ........................... 395/400, 425, 395/375, 200, 500, 421.06, 421.1, 421.01, 421.02, 402, 307; 711/1, 2, 6, 203, 212, 216, 220

[56] References Cited

U.S. PATENT DOCUMENTS

| | | | |
|---|---|---|---|
| 4,096,568 | 6/1978 | Bennett et al. | 364/200 |
| 4,206,503 | 6/1980 | Woods et al. | 395/421.02 |
| 5,095,420 | 3/1992 | Eilert et al. | 395/400 |
| 5,129,070 | 7/1992 | Dorotte | 395/402 |
| 5,210,840 | 5/1993 | Fukagawa et al. | 395/400 |
| 5,218,684 | 6/1993 | Hayes et al. | 395/400 |
| 5,255,384 | 10/1993 | Sachs et al. | 395/425 |
| 5,381,537 | 1/1995 | Baum et al. | 395/400 |
| 5,420,992 | 5/1995 | Killian et al. | 395/375 |

*Primary Examiner*—Kevin J. Teska
*Assistant Examiner*—Matthew Loppnow
*Attorney, Agent, or Firm*—Foley & Lardner

[57] ABSTRACT

A method for managing virtual address space in which programs designed for smaller virtual address spaces in the multiple virtual memory scheme can be collectively allocated to a single enlarged virtual address space in the single virtual memory scheme efficiently, without requiring any change in the programs themselves, such that the entire virtual address space becomes available in the compatible mode. In the method, the effective addresses to be used during an execution of a program designed for a smaller address space are calculated by combining an appropriate address base for this program specifying upper bits of the effective address and lower bits of the virtual addresses for a region of the enlarged address space to which this program is allocated. The address base may be replaced by the upper bits of the starting address of the program in the enlarged address space which are retained throughout the effective address calculation. The method may use a compatible mode address region to be used in executing a program designed for a smaller address space which has virtual addresses identical to those to which this program is designed to be allocated in the smaller address space.

19 Claims, 15 Drawing Sheets

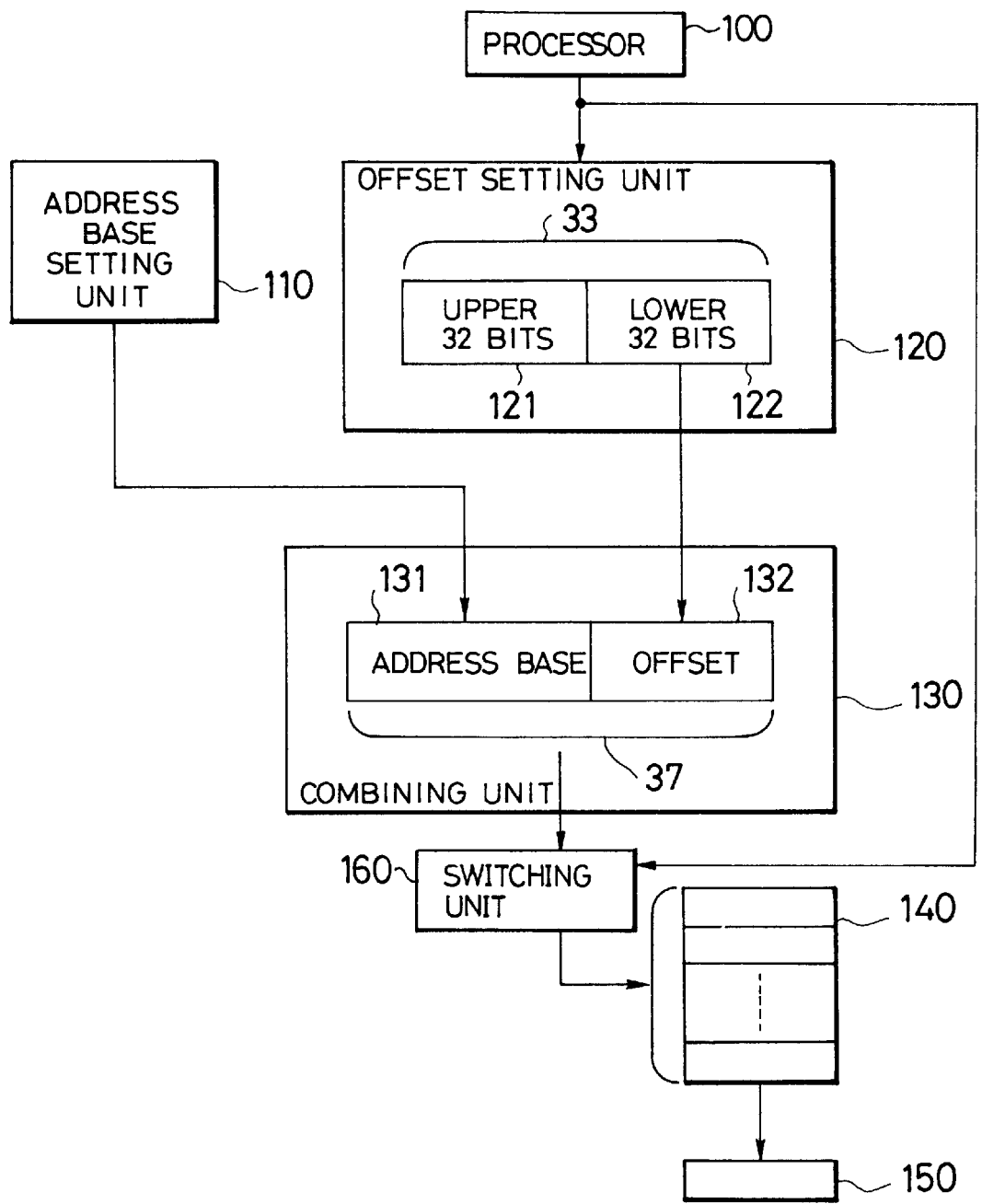

FIG. 14

| | VIRTUAL ADDRESS | PHYSICAL ADDRESS |
|---|---|---|
| 116A | 0<br>4K<br>$\vdots$<br>$2^{32} - 4K$ | a OO<br>a OO<br>$\vdots$<br>a OO |
| 116B | $2^{32} + 0$<br>$2^{32} + 4K$<br>$\vdots$<br>$2^{32} + 2^{32} - 4K$ | b OO<br>b OO<br>$\vdots$<br>b OO |
| | $\vdots$ | $\vdots$ |
| 116Z | $z \cdot 2^{32} + 0$<br>$z \cdot 2^{32} + 4K$<br>$\vdots$<br>$z \cdot 2^{32} + 2^{32} - 4K$ | z OO<br>z OO<br>$\vdots$<br>z OO |

| PROGRAM | STATE | ADDRESS MODE | ADDRESS BASE VALUE |
|---|---|---|---|
| A | EXECUTING | 0 | a |
| B | WAITING FOR EXECUTION | 1 | b |
| $\vdots$ | $\vdots$ | $\vdots$ | $\vdots$ |
| Z | WAITING FOR I/O | 1 | z |

FIG. 19

| PROGRAM | STATE | ROOT POINTER VALUE |
|---------|-------|--------------------|
| A | EXECUTING | a |
| B | WAITING FOR EXECUTION | b |
| ⋮ | ⋮ | ⋮ |
| Z | WAITING FOR I/O | z |

METHOD FOR MANAGING VIRTUAL ADDRESS SPACE AT IMPROVED SPACE UTILIZATION EFFICIENCY

BACKGROUND OF THE INVENTION

1. Field of the Invention

The present invention relates to a method for managing a virtual address space in a computer system employing a virtual memory scheme.

2. Description of the Background Art

In a recent computer system, there is a steady trend to enlarge an address space in order to deal with an increased scale of processing that is becoming executable at a higher performance level achieved by the recent computer systems.

As present, the computer systems having 32 bit address spaces are prevalent, but higher performance level computer systems having 64 bit address spaces have already been developed and such new computer systems are currently at a stage of commercialization.

In conjunction with a commercialization of such new computer systems, specially designed programs to be used in such new computer system are also developed, but it is also crucially important for such new computer systems to be capable of utilizing the already existing programs developed for the already existing lower performance level computer systems. For this reason, the system architecture and the instruction codes of the new computer system are designed to be compatible with those of the already existing computer systems.

However, such an already existing program developed for the already existing computer system is originally designed to use a smaller address space provided in the already existing computer system, so that when such an already existing program is used in the new computer system, an efficiency of utilizing a larger address space available in the new computer system will be quite low.

For example, in a case in which the already existing computer system has the 32 bit address space 90 (corresponding to $2^{32}$=4G bytes) as shown in FIG. 1A, in which the already existing program 91 can be accommodated along with some empty space 92, if the already existing program 91 is used as it is in the new computer system having 64 bit address space 93 (corresponding to $2^{64}$=$(4G)^2$ bytes) as shown in FIG. 1B, the empty space 92 will occupy the majority of the address space 93 such that most of the large capacity provided by the 64 bit address space 93 of the new system will be wasted.

In order to cope with this problem by reducing the region in the 64 bit address space 93 occupied by the empty space 92, it is possible to consider the so called single virtual memory scheme in which a plurality of already existing programs 91-1, 91-2, 91-3 are allocated to the same 64 bit address space 93 as shown in FIG. 1C. Such a single virtual memory scheme is advantageous over the so called multiple virtual memory scheme as shown in FIG. 1D in which a plurality of already existing programs 91-1, 91-2, and 91-3 are distributed to a plurality of separate address spaces 90-1, 90-2, and 90-3, in that the overhead due to the context switching required in switching from one address space to another address space can be eliminated.

More specifically, in a case of the multiple virtual memory scheme of FIG. 1D, the context switching for switching the program to be executed takes place when the execution of the currently executed program is completed, or when the currently executed program is waiting for the input or output, or when timer interruption due to the excessive CPU time consumption occurs in the currently executed program. Here, the context switching is achieved by saving the executed state of the currently executed program, and then exchanging the virtual address space altogether to the address space on which the program scheduled to be executed next is provided.

The overhead due to this context switching is large because the trap operation and the kernel codes are executed and the invalidation operation for the cache for the page tables called TLB (Translation Look-aside Buffer) and the cache for the memory data must be carried out at a time of the context switching. In particular, the invalidation operation for the purpose of maintaining the consistency of the cache is known to be time consuming.

In contrast, in a case of the single virtual memory scheme of FIG. 1C, there is no need to switch the virtual address space because all the programs are present on the single virtual address space, and the switching of the program to be executed can be achieved by using simple branching instructions. In addition, in the single virtual memory scheme, the programs are allocated to the single virtual address space without any overlap, so that there is no need to carry out the context switching for the purpose of maintaining the consistency of the cache. Consequently, it is possible in the single virtual memory scheme to execute the programs without any time loss, at the high speed.

Now, however, each of the already existing programs 91-1, 91-2, and 91-3 has been designed to be used in the multiple virtual memory scheme as shown in FIG. 1D, so that the single virtual memory scheme as shown in FIG. 1C cannot be adopted straightforwardly because the starting address of each program should be different in the single virtual memory scheme while the already existing programs are designed to use the same starting address. In addition, the absolute virtual addresses such as the branching addresses and the branch target addresses in the multiple virtual memory scheme are also used in each of the already existing programs 91-1, 91-2, and 91-3, and these addresses also need to be rewritten in a case of the single virtual memory scheme.

In order to cope with this problem, there has been a proposition to modify the binary module by re-calculating the starting address of the program and re-compiling the program by supplying each program in a form of a source program, so as to rearrange the stored positions of the programs in the 64 bit address space.

However, when there is no source program and only a binary module has been provided for the purpose of maintaining the binary compatibility, the starting address of the program as well as the branching addresses and the branch target addresses in the program cannot be changed, so that it has been impossible to realize the single virtual memory scheme of FIG. 1C.

Now, in maintaining the software compatibility between the already existing computer system and the new computer system, there are two approaches including an emulation by software and an emulation by hardware. The emulation by software has an advantage that it is easily realizable, but it also has a drawback that the execution speed is slow. On the other hand, the emulation by hardware has an advantage that the execution speed can be at least as fast as the already existing computer system, but it also has a drawback that the circuit configuration becomes complicated.

In realizing the emulation by hardware, the new computer system has a compatible mode in addition to a normal execution mode, such that the software of the already existing computer system can be executed in the compatible mode at the binary level. Here, when the new computer system has a larger address space than the already existing computer system, only the lower bits of the address bit sequence corresponding to the address in the already existing computer system are selectively used in the compatible mode, while the remaining upper bits of the address bit sequence are not used. However, since there are many addresses which share the same lower bits in the new computer system, it becomes necessary to specify the upper bits of the address bit sequence even in the compatible mode.

This specifying of the upper bits of the address bit sequence in the compatible mode has conventionally been made by setting all the upper bits to zero. In this manner, the addresses used in the compatible mode are allocated to a region with smallest addresses in the address space.

An example of a conventional device for specifying the address bit sequence has a schematic configuration as shown in FIG. 2. Namely, the upper bits 94 and the lower bits 95 are combined to form the entire address bit sequence 96, according to which an access to the memory device 97 is made, where the upper bits 94 entirely consists of zeros.

An example of a processor using such an address bit sequence is the Intel's CPU 80486 in which a virtual 8086 mode is realized by setting all the upper bits of the address bit sequence to zero such that the 8086 codes can be used on the 32 bit address space.

Such a manner of setting all the upper bits of the address bit sequence in the compatible mode to zero is easily realizable, but since the upper bits are fixed to be all zero, it is impossible to use any other region of the address space in the compatible mode.

For example, in the Intel's CPU 80486, even though the 32 bit address space has $2^{32}$=4G bytes of a capacity, the 8086 codes can utilize only the 1M bytes of the address region because the upper bits are fixed to be all zero. In order to rectify this drawback, there is provided the page tables which enable the 8086 codes to utilize the entire address space, but this provision of providing the page tables has another drawback that the overhead due to the page table switching is very large, and that the setting up of the protection mode becomes very complicated.

SUMMARY OF THE INVENTION

It is therefore an object of the present invention to provide a method for managing virtual address space in which programs designed for smaller virtual address spaces can be collectively allocated to a single enlarged virtual address space efficiently, without requiring any change in the programs themselves.

It is another object of the present invention to provide a method for managing virtual address space in which a plurality of programs designed for the multiple virtual memory scheme can be collectively allocated to a single virtual address space efficiently, without requiring any change in the programs themselves.

It is another object of the present invention to provide a method for managing virtual address space in which the entire virtual address space becomes available in the compatible mode.

According to one aspect of the present invention there is provided a method of managing virtual address space, comprising the steps of: (a) allocating a plurality of first type programs designed to be allocated to a plurality of first type address spaces to a second type address space having a size larger than that of the first type address space, collectively in a single virtual memory scheme, without any overlap in virtual addresses each other, each of the first type programs being distinct from second type programs designed to be allocated to the second type address space; (b) registering an address base for one of the first type programs to be executed, the address base specifying appropriate upper bits of the virtual addresses for a region of the second type address space to which said one of the first type programs is allocated at the step (a); and (c) calculating effective addresses to be used during an execution of said one of the first type programs by combining the address base for said one of the first type programs registered at the step (b) and lower bits of the virtual addresses for a region of the second type address space to which said one of the first type programs is allocated.

According to another aspect of the present invention there is provided a method of managing virtual address space, comprising the steps of: (a) allocating a plurality of first type programs designed to be allocated to a plurality of first type address spaces and at least one second type program designed to be allocated to a second type address space having a size larger than that of the first type address space, to the second type address space collectively in a single virtual memory scheme, without any overlap in virtual addresses, each of the first type programs being distinct from the second type programs designed to be allocated to the second type address space; (b) determining a currently executed program as either one of a first type program and a second type program, according to an instruction field of an address control instruction encountered during an execution of the currently executed program; and (c) when the currently executed program is determined as the first type program at the step (b), calculating effective addresses to be used during an execution of the currently executed program by combining upper bits of a starting address of the currently executed program in the second type address space and lower bits of the virtual addresses for a region of the second type address space to which the currently executed program is allocated at the step (a).

According to another aspect of the present invention there is provided a method of managing virtual address space, comprising the steps of: (a) allocating a plurality of first type programs designed to be allocated to a plurality of first type address spaces and at least one second type program designed to be allocated to a second type address space having a size larger than that of the first type address space, to the second type address space collectively in a single virtual memory scheme, without any overlap in virtual addresses, each of the first type programs being distinct from the second type programs designed to be allocated to the second type address space; (b) providing an indicator for indicating a currently executed program as either one of a first type program and a second type program; and (c) when the currently executed program is indicated as the first type program by the indicator provided at the step (b), calculating effective addresses to be used during an execution of the currently executed program by combining upper bits of a starting address of the currently executed program in the second type address space and lower bits of the virtual addresses for a region of the second type address space to which the currently executed program is allocated at the step (a).

According to another aspect of the present invention there is provided a method of managing virtual address space, comprising the steps of: (a) allocating a plurality of first type programs designed to be allocated to a plurality of first type address spaces to a second type address space having a size larger than that of the first type address space, collectively in a single virtual memory scheme, without any overlap in virtual addresses, each of the first type programs being distinct from second type programs designed to be allocated to the second type address space; (b) providing a compatible mode address region to be used in executing one of the first type programs in the second type address space, to which no program is permanently allocated and which has virtual addresses identical to those to which each of the first type programs is designed to be allocated in each of the first type address spaces; and (c) executing one of the first type programs by temporarily setting said one of the first type programs to be executed to the compatible mode address region in the second type address space provided at the step (b) during an execution of said one of the first type programs.

According to another aspect of the present invention there is provided an address calculation device for calculating an effective address to be used during an execution of a program allocated to virtual addresses in an address space, comprising: address base setting means for setting an address base specifying the upper bits of the effective address; offset setting means for setting an offset specifying lower bits of the effective address by selectively extracting lower bits of a full address bit sequence for one of the virtual addresses in the address space to which the program is allocated; and combining means for obtaining the effective address by combining the address base set by the address base setting means as the upper bits and the offset set by the offset setting means as the lower bits.

Other features and advantages of the present invention will become apparent from the following description taken in conjunction with the accompanying drawings.

BRIEF DESCRIPTION OF THE DRAWINGS

FIG. 10 is a schematic block diagram of an address calculation device suitable for the first and second embodiments of the method for managing virtual address space according to the present invention.

FIG. 14 is a diagrammatic illustration of a page table to be used in the hardware configuration of FIG. 13.

FIG. 15 is a diagrammatic illustration of a program management table to be used in the hardware configuration of FIG. 13.

FIG. 19 is a diagrammatic illustration of a program management table to be used in the hardware configuration of FIG. 17.

DETAILED DESCRIPTION OF THE PREFERRED EMBODIMENTS

Now, the various embodiments of the method for managing virtual address space according to the present invention will be described. In the following, the description will be given for an exemplary case of using the program designed to be used in an already existing computer system having a 32 bit address space on a new computer system having a 64 bit address space, although the present invention is by no means limited to this exemplary case and has a general applicability to any other conceivable cases.

Figure 1A:
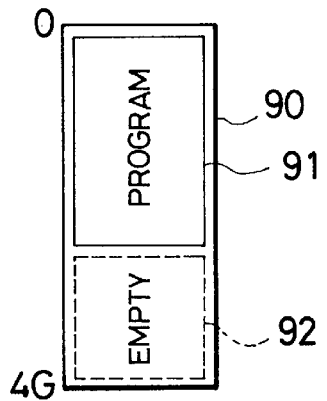
FIG. 1A is a schematic diagram representing a case of allocating an already existing 32 bit program to a 32 bit address space.
Figure 1B:
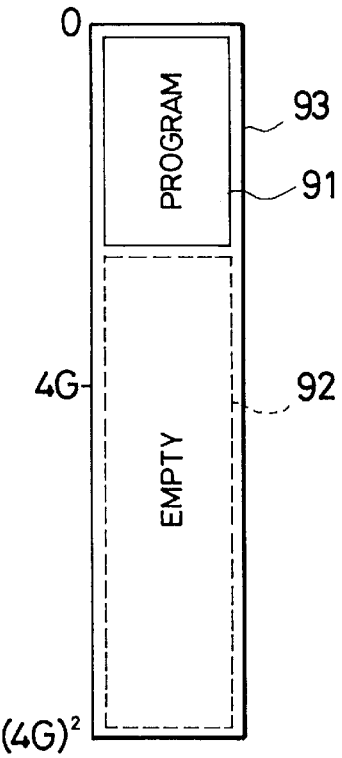
FIG. 1B is a schematic diagram representing a case of allocating an already existing 32 bit program to a 64 bit address space.
Figure 1C:
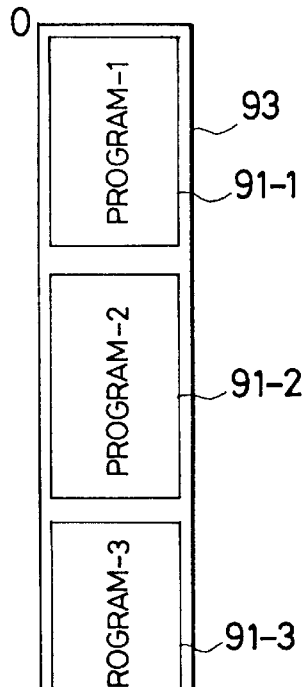
FIG. 1C is a schematic diagram representing a case of allocating a plurality of already existing 32 bit programs to a 64 bit address space in a single virtual memory scheme.
Figure 1D:
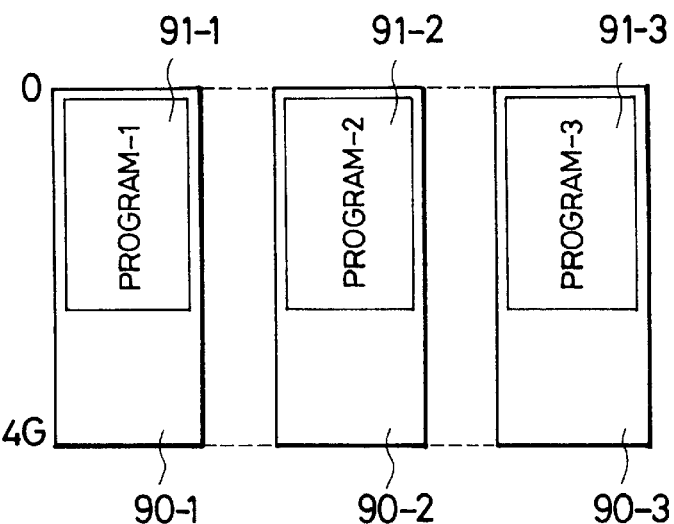
FIG. 1D is a schematic diagram representing a case of allocating a plurality of already existing 32 bit programs to a plurality of 32 bit address spaces in a multiple virtual memory scheme.
Figure 2:
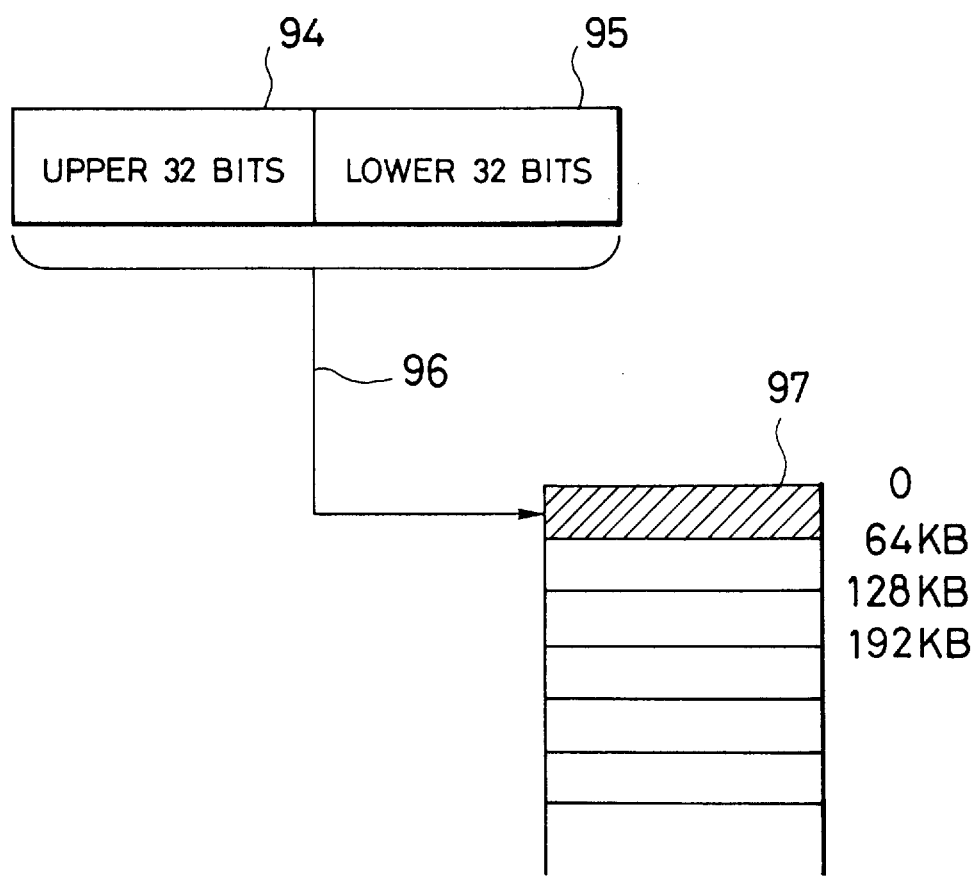
FIG. 2 is a schematic diagram of a conventional device for specifying the address bit sequence in the compatible mode.
Figure 3:
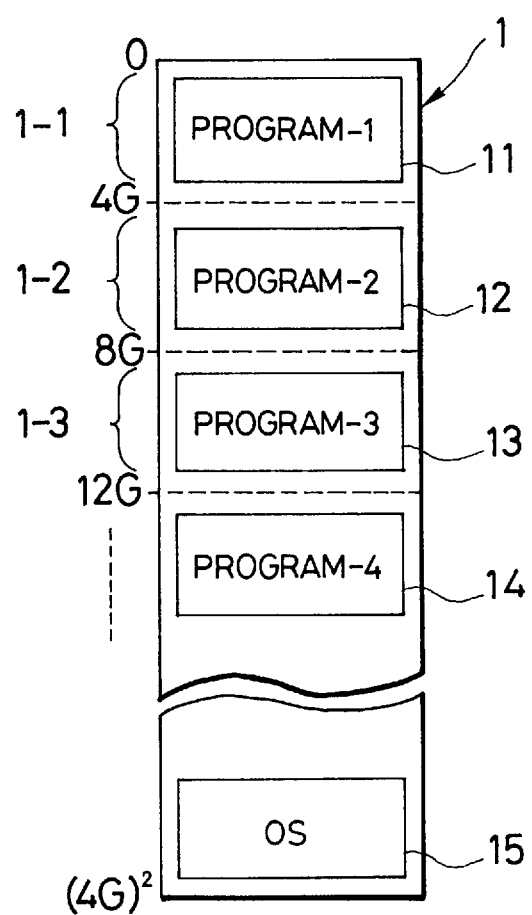
FIG. 3 is a schematic diagram representing a case of allocating a plurality of already existing 32 bit programs along with a 64 bit program and an OS in a 64 bit address space in a single virtual memory scheme by using a first embodiment of the method of managing virtual address space according to the present invention.

Referring now to FIG. 3, a first embodiment of the method for managing virtual address space according to the present invention will be described in detail.

In this first embodiment, the programs are arranged in a 64 bit address space 1 (corresponding to $2^{64}=(4G)^2$ bytes) as shown in FIG. 3. Namely, the 64 bit address space stores a program-1 11, a program-2 12, and a program-3 13 which are designed for the 32 bit address spaces (referred thereafter as 32 bit programs), along with a program-4 14 which is designed for the 64 bit address space (referred hereafter as a 64 bit program) and an OS (Operating System) 15.

Here, each of the 32 bit programs 11, 12, and 13 has a maximum size equal to $2^{32}=4G$ bytes, while the 64 bit program 14 may have a size larger than 4G bytes, and all the 32 bit programs 11, 12, and 13 are allocated to top three blocks in units of 4G bytes (referred hereafter as 4G byte blocks) 1-1, 1-2, and 1-3, while the 64 bit program 14 is allocated to an address region starting from the 12G-th byte, and the OS 15 is allocated at a bottom of the 64 bit address space 1.

Figure 4:
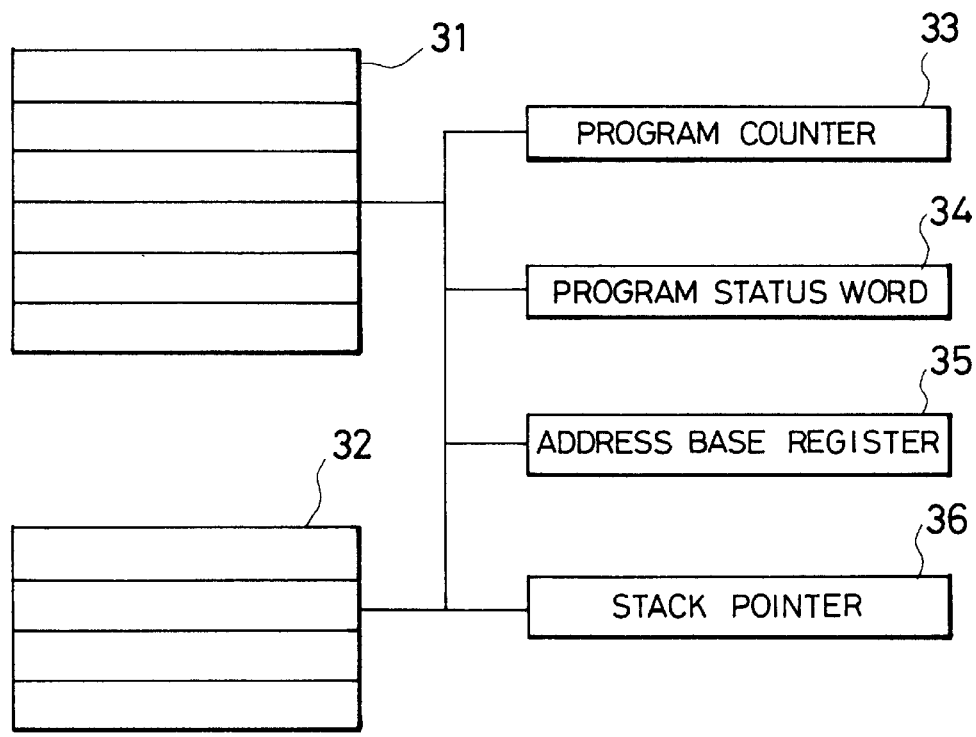
FIG. 4 is a schematic diagram of a register configuration for a processor for carrying out the first embodiment of the method for managing virtual address space according to the present invention.

In this first embodiment, a processor for handling this 64 bit address space 1 has a register configuration as shown in FIG. 4 including: a general purpose registers 31; other registers 32 associated with usual processor functions; a program counter (PC) 33; a program status word (PSW) 34; an address base register 35; and a stack pointer (SP) 36.

Figure 5:
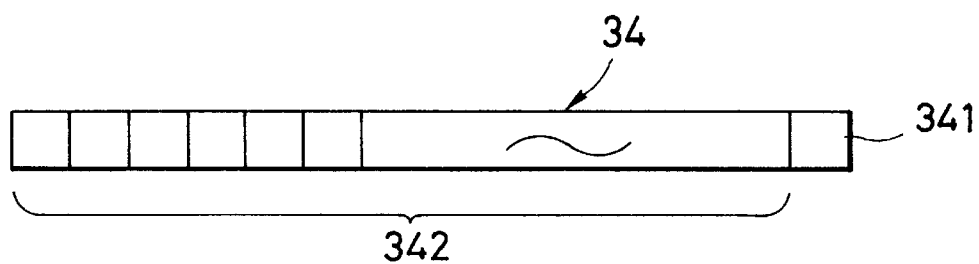
FIG. 5 is a schematic diagram of a program status word used in the register configuration of FIG. 4.

Here, the general purpose registers 31, the other registers 32, the program counter (PC) 33, and the stack pointer (SP) 36 are substantially similar to those provided in a usual processor for a computer system using a virtual address space. However, as shown in FIG. 5, the program status word (PSW) 34 includes an address base validity flag 341 for indicating whether the address base register 35 is valid or not, i.e., whether the address base register 35 is to be utilized in the address calculation or not, in addition to a usual program status word entry 342 used in the usual processor.

The address base register 35 indicates one of the three 4G byte blocks 1-1, 1-2, and 1-3 on which the currently executed one of the 32 bit programs 11, 12, and 13 is allocated, in a case of executing one of the 32 bit programs 11, 12, and 13.

Now, the operation of the calculation of addresses for making accesses to the 64 bit address space 1 (referred hereafter as effective addresses) when the instruction codes are identical in the 32 bit computer system and the 64 bit computer system will be described in detail.

First, in a case of executing the 32 bit program 11 allocated to the 4G byte block 1-1 at a top of the 64 bit address space 1, the effective addresses for this 32 bit program 11 in this 64 bit address space 1 are identical to addresses which would have been used in the 32 bit address space, so that this 32 bit program 11 can be executed straightforwardly, without requiring any change at all to this 32 bit program 11 itself.

On the other hand, in a case of executing either one of the 32 bit programs 12 and 13 allocated to the 4G byte blocks 1-2 and 1-3, respectively, the effective addresses for these 32 bit programs 12 and 13 in this 64 bit address space 1 are displaced from addresses which would have been used in the 32 bit address space, so that these 32 bit programs 12 and 13 cannot be executed straightforwardly.

Figure 6:
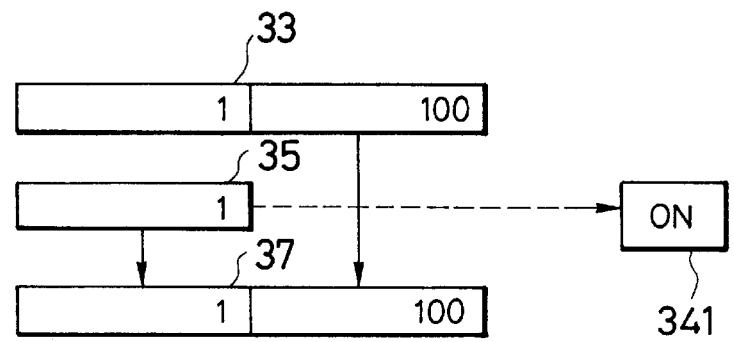
FIG. 6 is a diagram indicating a procedure of an effective address calculation for a starting address in a 32 bit program by the first embodiment of the method for an aging virtual address space according to the present invention.

Here, for example in a case of executing the 32 bit program 12, the OS 15 recognizes that the program-2 12 is the 32 bit program by reading the attribute information attached to the program-2 12 at a time of allocating this program-2 12 to the 64 bit address space 1, so that at a time of executing this program-2 12 under the control of the OS 15, in addition to setting the starting address of the program-2 12 to the program counter (PC) 33, the OS 15 also sets the address base validity flag 341 in the program status word (PSW) 34 to an ON state indicating that the address base register 35 is valid, and the appropriate address base value "1" for the 4G byte block 1-2 to which this program-2 12 is allocated to the address base register 35, as shown in FIG. 6.

As a result, as indicated in FIG. 6, when the starting address of the program-2 12 is the address "100" in the 32 bit address space, the effective starting address 37 is calculated by combining the upper 32 bits specified by the address base register 35 (which in this case is "1") and the lower 32 bits specified by the program counter (PC) 33 (which in this case is "100"), according to the ON state indicated by the address base validity flag 341.

It is to be noted here that this address calculation operation according to FIG. 6 can be achieved by a very simple mechanism, so that there is hardly any overhead due to this address calculation.

It is also to be noted that in this case of the starting address depicted in FIG. 6, the OS 15 knows the fact that the starting address of the program-2 12 is "4G+100" in advance, so that the starting address set to the program counter (PC) 33 already indicates the address "4G+100", which happens to be equal to the effective starting address obtained by using the address base register 35.

Next, in a case of executing an instruction in the program-2 12 which is either an address control instruction for controlling the execution address such as a call instruction or a jump instruction, or an instruction utilizing the register indicating a position in the virtual address space such as a stack pointer or a program counter, or else an instruction which specifies a position of the data in the virtual address space in order to read or write this data such as a load instruction, the operation of the calculation of effective addresses is carried out as follows.

Figure 7:
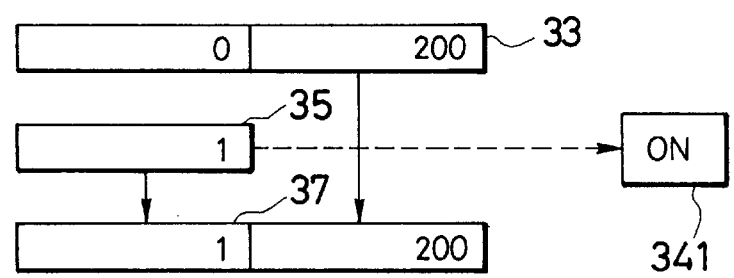
FIG. 7 is a diagram indicating a procedure of an effective address calculation for an address control instruction in a 32 bit program by the first embodiment of the method for managing virtual address space according to the present invention.

Namely, as shown in FIG. 7, when a jump instruction for jumping to a target address "200" in the 32 bit address space is encountered at the address "4G+100" in the 64 bit address space 1 during the execution of the program-2 12 for example, the program counter (PC) 33 indicates this target address "200" in the 32 bit mode as it is, so that if the jumping is made according to the indication of this program counter (PC) 33 as it is, the jumping would be made to a region belonging to the 4G byte block 1-1 for the different program-1 11.

Here, however, as the address base validity flag 341 is in the ON state, the effective address is actually calculated by combining the upper 32 bits specified by the address base register 35 (which in this case is "1") and the lower 32 bits specified by the program counter (PC) 33 (which in this case is "200"), such that the proper effective address 37 indicating "4G+200" can be obtained as indicated in FIG. 7.

Next, in a case of executing a return instruction in the program-2 12, the operation of the calculation of effective addresses is carried out as follows.

Namely, in this case of executing the return instruction, the content of the stack indicated by the stack pointer (SP) 36 is to be returned to the general purpose registers 31. To this end, according to the ON state of the address base validity flag 341, the effective address for the stack indicated by the stack pointer (SP) 36 is calculated by combining the upper 32 bits specified by the address base register 35 and the lower 32 bits specified by the stack pointer (SP) 36 so as to retrieve the content of the stack to be returned, and then the effective address to which the retrieved content is to be returned is calculated by combining the upper 32 bits specified by the address base register 35 and the lower 32 bits specified by the program counter (PC) 33, just as in the case of the jump instruction described above.

On the other hand, in a case of returning to the OS 15 after the execution of the program-2 12 has been finished, a system call for finishing the program is executed. Here, however, the execution of this system call uses the specialized instruction such as a trap instruction as the machine instruction, so that the address base validity flag 341 is set back to the OFF state as the effective address calculation becomes unnecessary.

It should be clear that the execution of the program-3 13 can be also handled similarly to the various cases described above for the program-2 12.

As for the case of executing the 64 bit program 14, the effective address calculation is unnecessary from the beginning, so that the OS 15 maintains the address base validity flag 341 to be in the OFF state throughout the entire execution of the 64 bit program 14.

Figure 8:
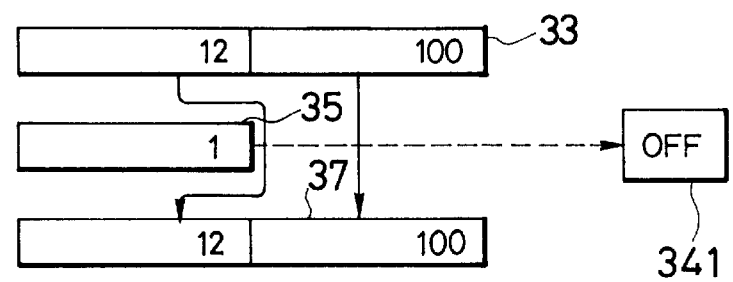
FIG. 8 is a diagram indicating a procedure of an effective address calculation for a starting address in a 64 bit program by the first embodiment of the method for managing virtual address space according to the present invention.

For example, as indicated in FIG. 8, when the starting address of the 64 bit program 14 is the address "12G+100" in the 64 bit address space 1, this starting address which is set to the program counter (PC) 33 can be directly utilized as the effective starting address 37, by disregarding the address base register 35 according to the OFF state of the address base validity flag 341 indicating that the address base register 35 is invalid.

Also, in a case of executing a jump instruction in the 64 bit program 14, it is possible to make a jump to any address in the 64 bit address space as the address base validity flag 341 remains in the OFF state.

It is to be noted that the first embodiment described above may be modified such that the effective address calculation operation can be achieved without using the address base validity flag 341 as follows.

Namely, when an address control instruction such as a jump instruction is encountered during the execution of the 32 bit program, the fact that this instruction is for the 32 bit program can be recognized by interpreting the instruction field of the machine code of this address control instruction.

Consequently, instead of judging the appropriate address calculation mode according to the address base validity flag 341 as described above, whether or not to use the address base register 35 in the address calculation can be determined according to the instruction field of the machine code of each instruction.

Figure 9:
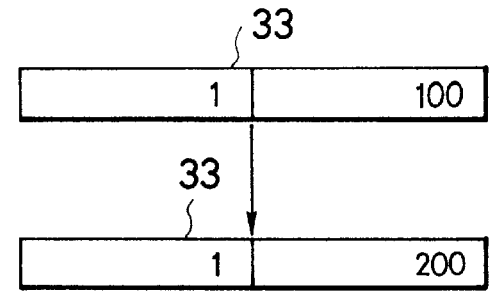
FIG. 9 is a diagram indicating a procedure of an effective address calculation for an address control instruction in a 32 bit program by a second embodiment of the method for managing virtual address space according to the present invention.

Referring now to FIG. 9, a second embodiment of the method for managing virtual address space according to the present invention will be described in detail.

In this second embodiment, the 64 bit address space 1 as shown in FIG. 3 and the processor equipped with the register configuration as shown in FIG. 4 are also utilized, except that the address base validity flag 341 in the program status word 34 and the address base register 35 can be omitted.

This second embodiment is a modification of the first embodiment described above suitable for a case in which the instruction codes for the address control instructions such as the call instruction, the jump instruction, and the return instruction are not identical in the 32 bit computer system and the 64 bit computer system.

In this second embodiment, the effective address calculation operation can be achieved without using the address base validity flag 341 and the address base register 35 as follows.

Namely, in a case of executing the instruction of the 32 bit program, the upper 32 bits of the program counter (PC) 33 are fixed so as to maintain the same values as those given as the upper 32 bits of the starting address.

For example, in the above described case in which a jump instruction for jumping to a target address "200" in the 32 bit address space is encountered at the address "4G+100" in the 64 bit address space 1 during the execution of the program-2 12, the fact that this instruction is for the 32 bit program can be recognized by interpreting the instruction field of the machine code of this jump instruction.

Consequently, as indicated in FIG. 9, when the program counter (PC) 33 is set next to the jump target address, the upper 32 bits of the program counter (PC) 33 are fixed, and only the lower 32 bits of the program counter (PC) 33 are changed to those of the jumping target address which in this case are "200". As a result, the proper effective address 37 indicating "4G+200" can be set to the program counter (PC) 33.

As for a case of executing the return instruction, the proper return operation can be achieved by setting the lower 32 bits of the address saved in the stack into the lower 32 bits of the program counter (PC) 33, while fixing the upper 32 bits of the program counter (PC) 33 to maintain the same values for the upper 32 bits.

It is to be pointed out that, in this second embodiment, the jumping from one 4G byte block is limited within this same 4G byte block, as the upper 32 bits of the program counter (PC) 33 takes a fixed value throughout the execution of one 32 bit program, in contrast to the above described first embodiment in which the jumping to any address in the 64 bit address space 1 can be realized by using the appropriate address base value in the address base register 35.

It is also to be noted that, in this second embodiment, the effective address calculation operation may also be achieved by using a special flag similar to the address base validity flag 341 which is set to the ON state only when the 32 bit program is executed and according to which the fixing of the upper 32 bits of the program counter (PC) 33 as described above is carried out.

More specifically, the program status word 34 may have an address fixing validity flag similar to the address base validity flag 341 described above, where the address fixing validity flag indicates the validity of the effective address calculation operation using the fixing of the upper 32 bits of the program counter (PC) 33 instead. In addition, the OS is provided with a special instruction called "jump & emulate" instruction for making a transition to the 32 bit mode by setting the starting address of the 32 bit program to be executed next to the program counter (PC) 33 and turning the address fixing validity flag into an ON state indicating the effective address calculation operation using the fixing of the upper 32 bits of the program counter (PC) 33 to be valid.

In this case, this address fixing validity flag is used in the effective address calculation operation as follows.

For example, in the above described case in which a jump instruction for jumping to a target address "200" in the 32 bit address space is encountered at the address "4G+100" in the 64 bit address space 1 during the execution of the program-2 12, the OS 15 knows the fact that the starting address of the program-2 12 is "4G+100" as well as the fact that this instruction is the 32 bit program according to its program management table, so that this starting address "4G+100" is set to the program counter (PC) 33 by using the "jump & emulate" instruction. At this point, the address fixing validity flag is not in the ON state yet, so that the address set to the program counter (PC) 33 by the OS 15 becomes the effective starting address.

Then, as the controlling is switched from the OS 15 to the program-2 12, the address fixing validity flag is turned into the ON state by the "jump & emulate" instruction so as to enter the 32 bit mode.

In this situation, in a case of executing an instruction in the program-2 12 which is either an address control instruction for controlling the execution address such as a call instruction or a jump instruction, or an instruction utilizing the register indicating a position in the virtual address space such as a stack pointer or a program counter, or else an instruction which specifies a position of the data in the virtual address space in order to read or write this data such as a load instruction, the operation of the calculation of effective addresses is carried out as follows.

Namely, when a jump instruction for jumping to a target address "200" in the 32 bit address space is encountered at the address "4G+100" in the 64 bit address space 1 during the execution of the program-2 12 for example, the program counter (PC) 33 indicates this target address "200" in the 32 bit mode as it is, so that if the jumping is made according to the indication of this program counter (PC) 33 as it is, the jumping would be made to a region belonging to the 4G byte block 1-1 for the different program-1 11.

Here, however, as the address fixing validity flag is in the ON state, the effective address is actually calculated by fixing the upper 32 bits of the program counter (PC) 33 so as to maintain the same values as those given as the upper 32 bits of the starting address (which in this case is "1") while the lower 32 bits is changed to those specified by the program counter (PC) 33 (which in this case is "200"), such that the proper effective address indicating "4G+200" can be obtained.

Next, in a case of executing a return instruction in the program-2 12, the operation of the calculation of effective addresses is carried out as follows.

Namely, in this case of executing the return instruction, the content of the stack indicated by the stack pointer (SP) 36 is to be returned to the general purpose registers 31. To this end, according to the ON state of the address fixing validity flag, the effective address for the stack indicated by the stack pointer (SP) 36 is calculated by combining the upper 32 bits specified by the program counter (PC) 33 and the lower 32 bits specified by the stack pointer (SP) 36 so as to retrieve the content of the stack to be returned, and then the effective address to which the retrieved content is to be returned is calculated by fixing the upper 32 bits of the program counter (PC) 33 so as to maintain the same values as those given as the upper 32 bits of the starting address while the lower 32 bits is changed to those specified by the program counter (PC) 33, just as in a case of the jump instruction described above.

On the other hand, in a case of returning to the OS 15 after the execution of the program-2 12 has been finished, a system call for finishing the program is executed. Here, however, the execution of this system call uses the specialized instruction such as a trap instruction as the machine instruction, so that the address fixing validity flag is set back to the OFF state as the effective address calculation becomes unnecessary.

Thus, according to the first and second embodiment described above, it becomes possible to provide a method for managing virtual address space in which programs designed for smaller virtual address spaces can be collectively allocated to a single enlarged virtual address space efficiently, without requiring any change in the programs themselves, so that the efficiency of utilization of the resource can be improved while the overhead due to the switching among a plurality of virtual address spaces becomes unnecessary.

It is to be pointed out that, in the first and second embodiments described above, instead of obtaining the effective address by combining the value set in the address base register 35 with the value stored in the register which is the value specified by the executed instruction, the effective address may also be obtained by directly combining the value specified by the executed instruction with the value set in the address base register 35, and the obtained effective address may be stored in the appropriate register afterwards.

Referring now to FIG. 10, an address calculation device suitable for the above described first and second embodiments of the method for managing virtual address space according to the present invention will be described in detail.

Namely, the address calculation device of FIG. 10 comprises: an address base setting unit 110 for setting an address base specifying upper 32 bits of the effective address 37 to be obtained, independently from an address bit sequence outputted by a processor 100 to an address bus line; an offset setting unit 120 for setting an offset specifying lower 32 bits of the effective address 37 to be obtained by selectively outputting the lower 32 bits 122 of the address bit sequence outputted by the processor 100 to the address bus line while disregarding the upper 32 bits 121 of the address bit sequence; and a combining unit 130 for combining the address base set by the address base setting unit 110 and the offset set by the offset setting unit 120 to obtain the effective address 37 formed from the upper 32 bits 131 specified by the address base and the lower 32 bits 132 specified by the offset.

In this address calculation device of FIG. 10, a desired data 150 stored in a memory device 140 can be accessed by making an access to the memory device 140 with the effective address 37 obtained at the combining unit 130, as indicated in FIG. 10. In this case, the memory device 140 may be provided with means for translating the virtual address to the physical address, or the page table obtained by such an address translation in addition to the physical addresses.

Here, it is not necessary for the address base setting unit 110 to determine the address base every time an access to the memory device 140 is to be made because the address base can remain fixed during an execution of a single program, whereas it is necessary for the offset setting unit 120 to determine the offset every time an access to the memory device 140 is to be made because the offset can change during an execution of a single program. However, because the offset setting unit 120 can determine the offset by simply masking the upper 32 bits of the address bit sequence outputted by the processor 100, a time required for this operation by the offset setting unit 120 can be made to be negligibly short in practice.

Figure 11A:
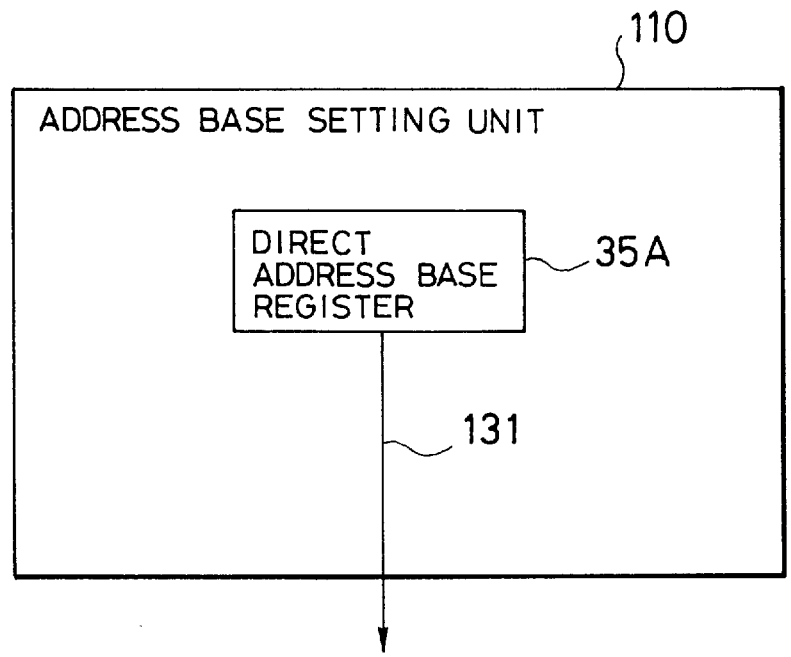
FIG. 11A is a schematic block diagram of one configuration of an address base setting unit in the address calculation device of FIG. 10.

The address base setting unit 110 may be realized in a configuration shown in FIG. 11A, which comprises an direct address base register 35A which directly specifies an appropriate address base value to be used in the combining unit 130 as the upper 32 bits 131, where the appropriate address base value is registered in this direct address base register 35A in advance.

Figure 11B:
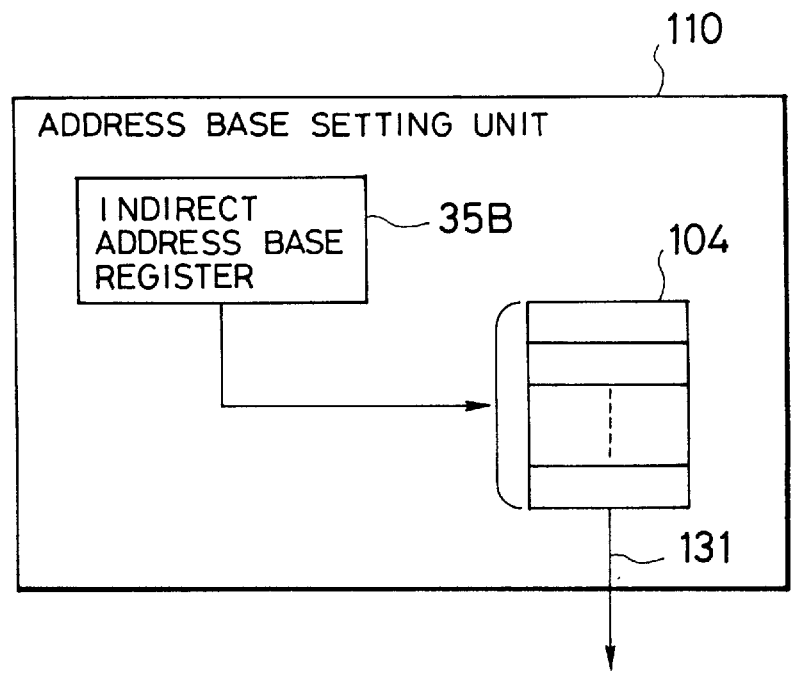
FIG. 11B is a schematic block diagram of another configuration of an address base setting unit in the address calculation device of FIG. 10.

Alternatively, the address base setting unit 110 may be realized in a configuration shown in FIG. 11B, which comprises an address base register bank 104 for storing a plurality of candidate address base values, and an indirect address base register 35B for specifying one entry of the address base register bank 104 to select one of the candidate address base values as an appropriate address base value to be used in the combining unit 130 as the upper 32 bits 131. Here, the selection of the appropriate one of the candidate address base values from the address base register bank 104 can be made explicitly by the program such as OS, or implicitly according to a type of the instruction which is requiring this effective address.

Here, it is also possible to provide both of the configurations of FIGS. 11A and 11B along with an appropriate switching mechanism for selectively utilizing one of the configurations of FIGS. 11A and 11B. In addition, it is also to be noted that the configuration other than those shown in FIGS. 11A and 11B may also be employed for the address base setting unit 110.

In addition, as shown in FIG. 10, this address calculation device may be further equipped with a switching unit 160 between the combining unit 130 and the memory device 140, such that either one of the address bit sequence outputted from the processor 100 as it is or the effective address obtained by the combining unit 130 can be selectively transmitted to the memory device 140. Here, the control of this switching operation by the switching unit 160 can be made by the processor 100 by using the peripheral device control instructions.

Figure 12:
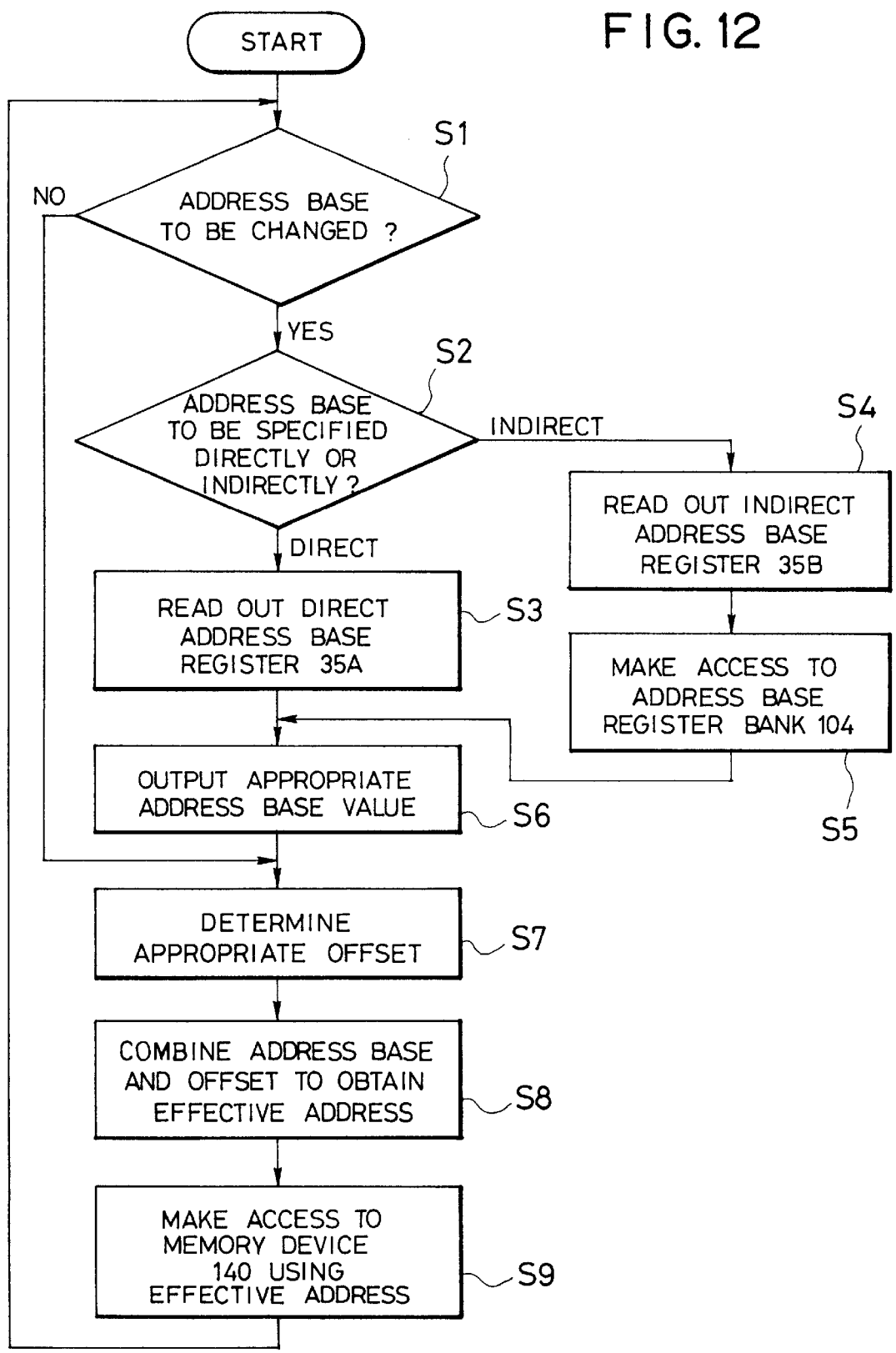
FIG. 12 is a flow chart for the memory access operation to be carried out by the address calculation device of FIG. 10.

More specifically, this address calculation device of FIG. 10 operates according to the flow chart of FIG. 12 as follows.

First, at the step S1, whether the address base is to be changed or not is determined. When the address base is not to be changed, the operation proceeds to the step S7 to be described below next.

Otherwise, next at the step S2, whether the address base is to be specified directly by using a configuration of FIG. 11A or indirectly by using a configuration of FIG. 11B is determined.

In a case of using a configuration of FIG. 11A, next at the step S3, the content registered in the direct address base register 35A is read out from the direct address base register 35A to obtain an appropriate address base value.

On the other hand, in a case of using a configuration of FIG. 11B, next at the step S4, the content registered in the indirect address base register 35B is read out from the indirect address base register 35B, and then at the step S5, the address base register bank 104 is accessed according to the content read out from the indirect address base register 35B at the step S4 to obtain an appropriate address base value.

Then, at the step S6, the appropriate address base value obtained at the step S3 or S5 is outputted to the combining unit 130 as the upper 32 bits 131.

Next, at the step S7, the offset setting unit 120 determines an appropriate offset by selectively outputting the lower 32 bits 122 of the address bit sequence outputted by the processor 100 to the address bus line while disregarding the upper 32 bits 121 of the address bit sequence and outputs the determined appropriate offset to the combining unit 130 as the lower 32 bits 132.

Then, at the step S8, the combining unit 130 obtains the effective address 37 formed from the upper 32 bits 131 specified by the address base and the lower 32 bits 132 specified by the offset by combining the address base set by the address base setting unit 110 and the offset set by the offset setting unit 120.

Finally, at the step S9, the desired data 150 stored in the memory device 140 is accessed by making an access to the memory device 140 with the effective address 37 obtained by the combining unit 130 at the step S8.

In this address calculation device of FIG. 10, the address base can be considered as effectively specifying a base address of an accessible address region while the offset can be considered as effectively specifying an offset value from the base address within the accessible address region.

Consequently, the accessible address region can be shifted to another address region by changing the address base. Here, a number of accessible address regions among which the accessible address region specified by the address base can be shifted is determined by a number of bits used for the address base. When the address base is given in N bits, the number of accessible address regions will be $2^N$. Thus, when the address base is given in 32 bits, the change of the address base by one corresponds to the shifting of the address region by 4G bytes. On the other hand, the size of each accessible address region is determined by a number of bits used for the offset. In a case the offset is given in M bits, the size of each accessible address region will be $2^M$ bytes ranging from an address "0" to an address "$(2^M-1)$".

Thus, by using this address calculation device of FIG. 10, it becomes possible to provide a method for managing virtual address space in which the entire virtual address space of the new computer system becomes available even for the already existing program in the compatible mode.

Figure 13:
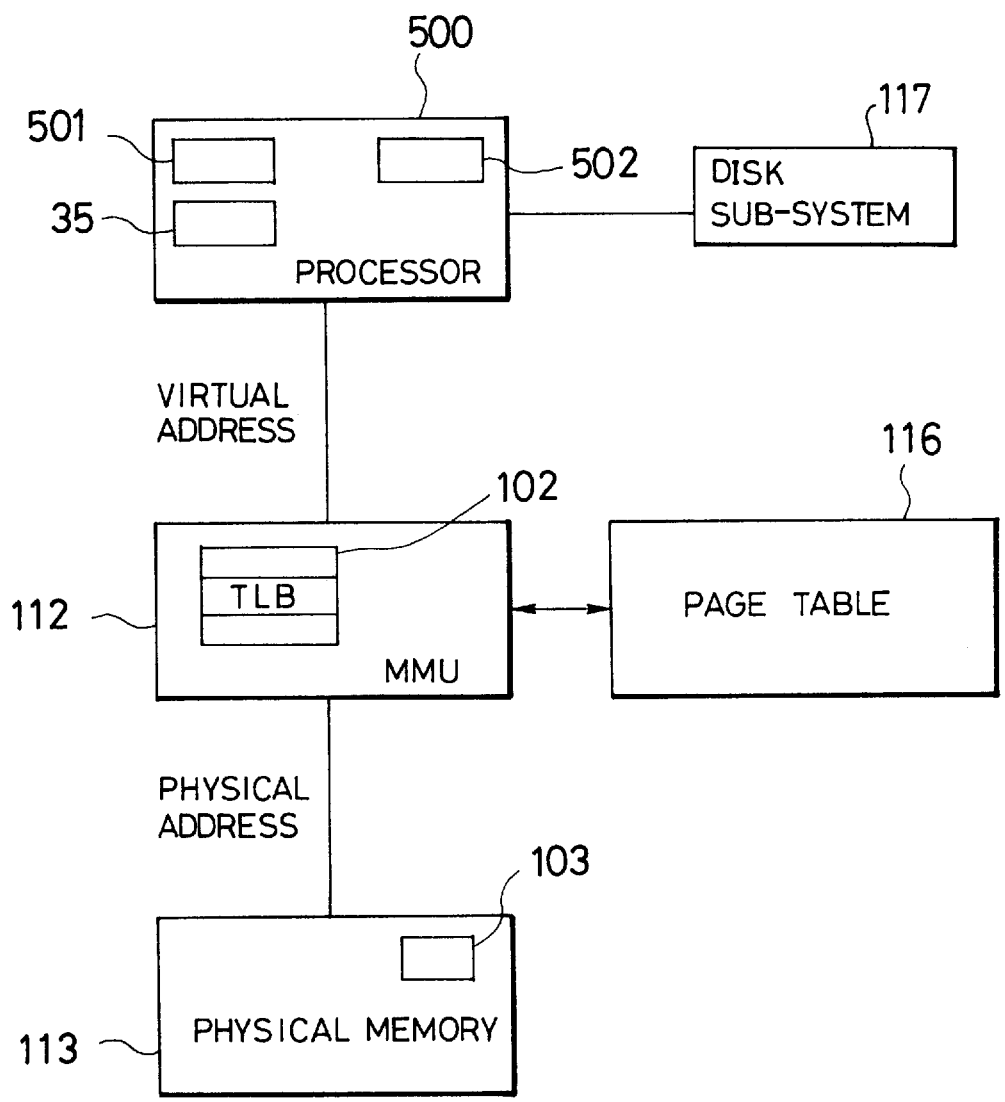
FIG. 13 is a schematic block diagram of a hardware configuration suitable for the first and second embodiments of the method for managing virtual address space according to the present invention.

Referring now to FIG. 13, a specific hardware configuration suitable for the above described first and second embodiments of the method for managing virtual address space according to the present invention will be described in detail.

The hardware configuration shown in FIG. 13 includes: a 64 bit processor 500 for executing programs; a memory management unit (MMU) 112 for translating a virtual address for memory access from the 64 bit processor 500 into a corresponding physical address by using a TLB (Translation Look-aside Buffer) 102; a physical memory device 113 for storing data to be used by the 64 bit processor 500 such as a program 103 to be executed, which is to be accessed by the physical address obtained by the memory management unit (MMU) 112; a page table unit 116 for storing a plurality of page tables, each of which containing a plurality of page table entries to be cached in the TLB 102 of the memory management unit (MMU) 112; and a disk sub-system 117 connected to the 64 bit processor 500.

In this configuration, the 64 bit processor 500 makes an access to the physical memory device 113 during the execution of the program by transmitting the virtual address to the memory management unit (MMU) 112. The memory management unit (MMU) 112 translates the virtual address into a corresponding physical address in the physical memory device 113 according to the page table entries cached in the TLB 102 at a high speed, and makes an access to the physical memory device 113 by using the obtained physical address.

The 64 bit processor 500 has: an address mode register 501 for indicating the 64 bit address mode by an entry "0" or the 32 bit address mode by an entry "1", which corresponds to the address base register validity flag 341 used in the description of the first embodiment given above; a root register 502 for storing a pointer indicating a starting address of one of the page tables in the page table unit 116 which is appropriate for a currently executed program; and the address base register 35 as described above. Here, the root register 502 may be provided on the memory management unit (MMU) 112 instead.

As shown in FIG. 14, the page table unit 116 contains the page tables 116A, 116B, . . . , 116Z for the programs A, B, . . . , Z, where different programs are allocated to mutually non-overlapping virtual addresses within a single virtual address space, as in the case of FIG. 3 described above, and each page table contains page table entries indicating starting virtual addresses of the pages in each program in correspondence to the corresponding physical addresses, where the size of each page is set to be 4K bytes in this configuration.

Also, the OS has a program management table shown in FIG. 15, which indicates a state of each program along with the address mode appropriate for each program and an address base value appropriate for each program, such that the indications of the address mode register 501 and the address base register 503 on the 64 bit processor 500 are changed according to this program management table, in accordance with the currently executed program.

Here, as already described for the first and second embodiments above, the 64 bit address set in the program counter of the processor 500 is used as it is when the address mode register 501 has an entry "0" indicating the 64 bit address mode, whereas when the address mode register 501 has an entry "1" indicating the 32 bit address mode, the upper 32 bits of the 64 bit address set in the program counter of the processor 500 is replaced by the address base value indicated by the address base register 35 while the lower 32 bits remain as they are.

Thus, when the address mode is set to be the 32 bit address mode, the 64 bit address space is effectively narrowed down to the 32 bit address space. Here, as indicated in the page tables shown in FIG. 14, the virtual addresses used in the programs share the common lower 32 bits while the upper 32 bits are assigned to be different for different programs, such that when the 64 bit address space is narrowed down to the 32 bit address space, all the programs have the same virtual addresses in the 32 bit address space effectively. In other words, the multiple virtual memory scheme can be effectively realized in the 32 bit address mode.

In this configuration, because the address base values are assigned to be different for different programs, the effective addresses used for each program do not overlap with the effective addresses for the other programs, so that there is no need to carry out the operation to maintain the consistency of the TLB 102 at a time of the context switching. Consequently, the binary compatibility for the 32 bit programs designed for the 32 bit computer systems can be used in the 64 bit address space without requiring any change in the 32 bit programs. In other words, it becomes possible to provide a method for managing virtual address space in which a plurality of programs designed for the multiple virtual memory scheme can be collectively allocated to a single virtual address space efficiently, without requiring any change in the programs themselves.

Figure 16:
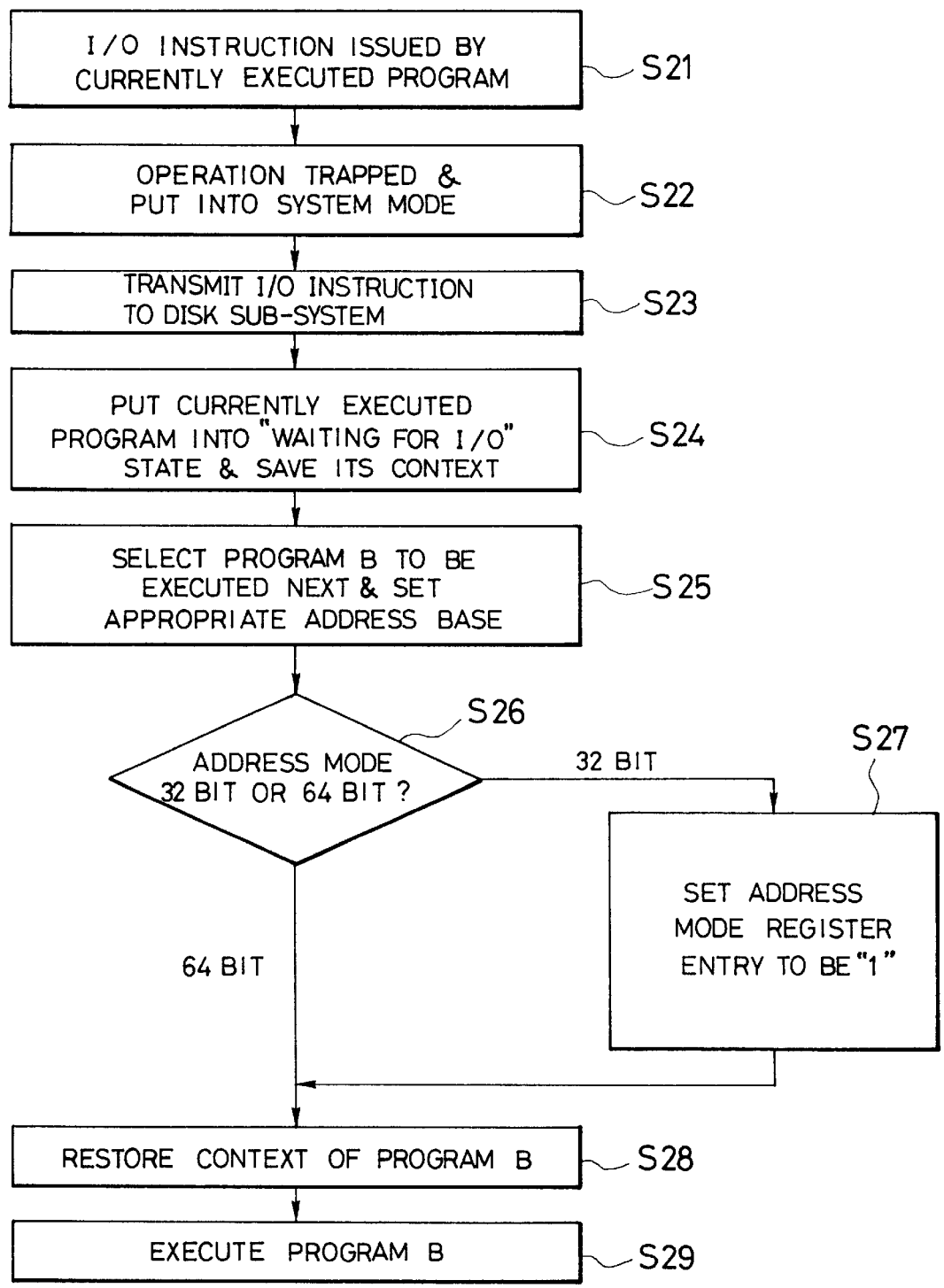
FIG. 16 is a flow chart of the context switching operation to be carried out in the hardware configuration of FIG. 13.

In this configuration, the context switching is carried out according to the flow chart of FIG. 16 as follows.

First, at the step S21, the currently executed program issues a system call including an input and output instruction with respect to the disk sub-system 117, such that the execution stops.

In response, next at the step S22, the operation is trapped and the operation mode is switched to a system mode, and at the step S23, the input and output instruction is transmitted to the disk sub-system 117.

Then, at the step S24, as it takes some time until the response comes from the disk sub-system 117, the currently executed program is put into "waiting for I/O" state, and the context of the currently executed program is saved.

Next, at the step S25, a program to be executed next is selected as the program B for example, and the appropriate address base value for this program B is set in the address base register 35, according to the program management table of FIG. 15 in the OS.

Then at the step S26, whether the appropriate address mode for this program B is the 32 bit address mode or the 64 bit address mode is determined, according to the program management table of FIG. 15 in the OS.

In a case of the 64 bit address mode, the entry of the address mode register 501 remains to be "0", so that the 64 bit address set in the program counter of the processor 500 is used as it is, and the operation proceeds to step S28, whereas in a case of the 32 bit address mode, next at the step S27, the entry of the address mode register 501 is set to be "1", such that the upper 32 bits of the 64 bit address set in the program counter of the processor 500 is replaced by the address base value indicated by the address base register 35 while the lower 32 bits remain as they are.

Then, at the step S28, the context for the program B is restored, and then at the step S29, the program B is executed.

Figure 17:
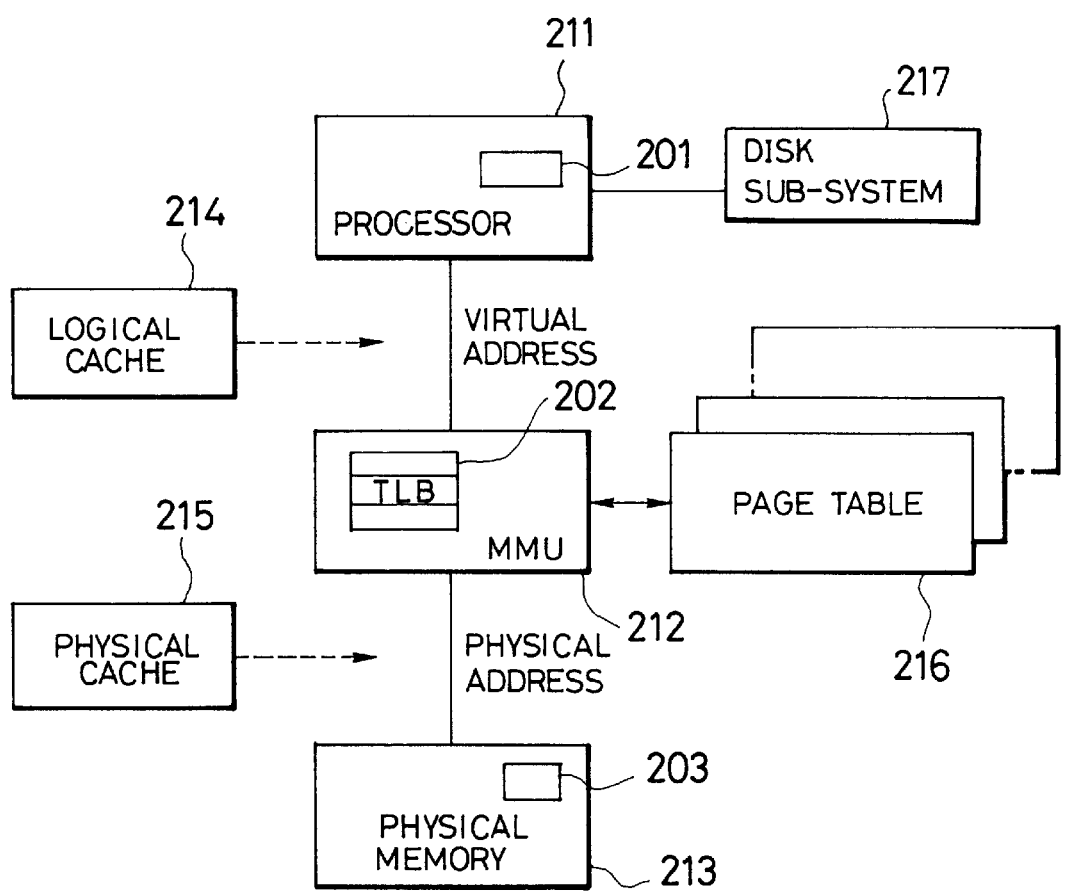
FIG. 17 is a schematic block diagram of a hardware configuration suitable for a third embodiment of the method for managing virtual address space according to the present invention.

Referring now to FIG. 17, a third embodiment of the method for managing virtual address space according to the present invention will be described in detail.

In this third embodiment, the method is carried out in a specific hardware configuration shown in FIG. 17 which includes: a 64 bit processor 211 for executing programs; a memory management unit (MMU) 212 for translating a virtual address for memory access from the 64 bit processor 211 into a corresponding physical address by using a TLB (Translation Look-aside Buffer) 202; a physical memory device 213 for storing data to be used by the 64 bit processor 211 such as a program 203 to be executed, which is to be accessed by the physical address obtained by the memory management unit (MMU) 212; a page table unit 216 for storing a plurality of page tables, each of which containing a plurality of page table entries to be cached in the TLB 202 of the memory management unit (IMMU) 212; a logical cache 214 for caching the virtual address to be transmitted between the processor 211 and the memory management unit (MMU) 212 at a high speed; a physical cache 215 for caching the physical address to be transmitted between the memory management unit (MMU) 212 and the physical memory device 213 at a high speed; and a disk sub-system 217 connected to the 64 bit processor 211.

In this configuration, the 64 bit processor 211 makes an access to the physical memory device 213 during the execution of the program by transmitting the virtual address to the memory management unit (MMU) 212 through the logical cache 214. The memory management unit (MMJU) 212 translates the virtual address into a corresponding physical address in the physical memory device 213 according to the page table entries cached in the TLB 202 at a high speed, and makes an access to the physical memory device 213 through the physical cache 215 by using the obtained physical address.

The 64 bit processor 211 has a root register 201 for storing a pointer indicating a starting address of one of the page tables in the page table unit 216 which is appropriate for a currently executed program. This root register 201 may be provided on the memory management unit (MMU) 212 instead. This root register 201 is changed every time there is a context switching, so as to cache the appropriate page table entries of the appropriate page table for the currently executed program into the TLB 202.

In this third embodiment, a plurality of 32 bit programs A and B designed for an already existing computer system in the multiple virtual memory scheme are to be utilized in a single 64 bit address space of a new computer system in the single virtual memory scheme.

Figure 18:
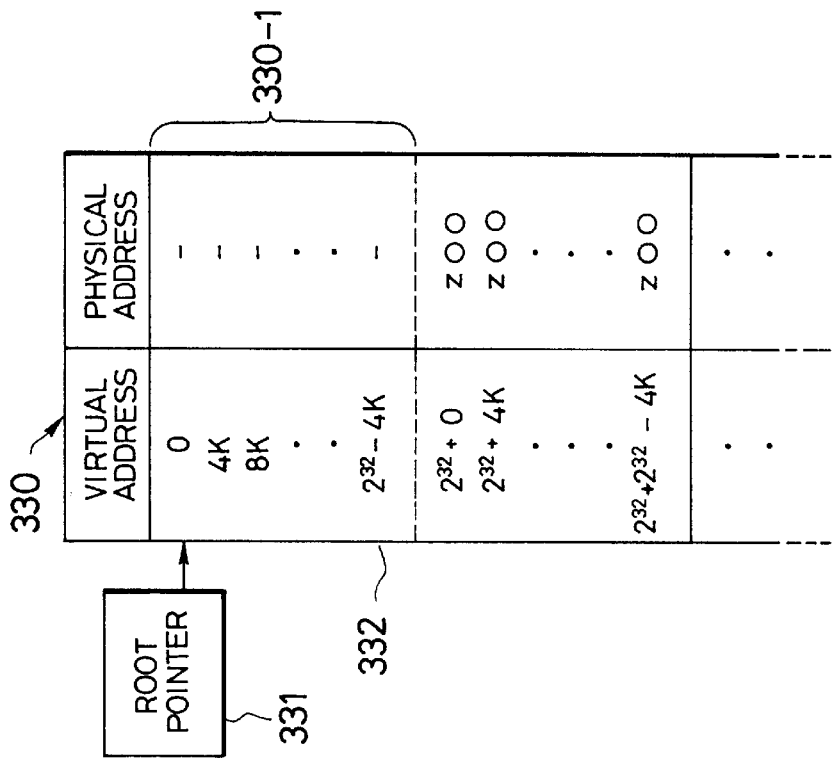
FIGS. 18A, 18B, and 18C are diagrammatic illustrations of page tables to be used in the hardware configuration of FIG. 17.

Here, each of the 32 bit programs A and B has a maximum size equal to $2^{32}$=4G bytes, and these 32 bit programs A and B share the same virtual addresses "0" to "$2^{32}-1$" as indicated in their page tables 310 and 320 shown in FIGS. 18A and 18B, respectively, where each page table contains page table entries indicating starting virtual addresses of the pages in each program in correspondence to the corresponding physical addresses and the size of each page is set to be 4K bytes.

The page tables 310 and 320 for the 32 bit programs A and B are also provided with root pointers 311 and 321, respectively, for indicating the starting addresses of the page tables 310 and 320, respectively. Consequently, when the 32 bit program A is to be executed, the root pointer 311 is set to the root register 201 of the processor 211 such that the address translation is carried out according to the page table 310, whereas when the 32 bit program B is to be executed, the root pointer 321 is set to the root register 201 of the processor 211, such that the address translation is carried out according to the page table 320.

In addition, as shown in FIG. 18C, there is provided a page table 330 for the entire 64 bit address space. As indicated by a top section 330-1 in this page table 330 of FIG. 18C, the 64 bit address space in this third embodiment has a top 4G byte block between the virtual addresses "0" and "$2^{32}-1$" which is left open, without any particular program allocated permanently, and reserved as a 32 bit compatible mode address region for executing a 32 bit program, while all the programs to be executed including the 32 bit programs and the 64 bit programs are allocated to the remaining region of this 64 bit address space, without any overlap in the virtual addresses between adjacently allocated ones. Thus, by temporarily setting the 32 bit program to be executed to the compatible mode address region provided by the top 4G byte block, the 32 bit program can be executed without changing the virtual addresses to be used, by using the virtual addresses "0" to "$2^{32}-1$" of the top 4G byte block in the 64 bit address space which are identical to those in the 32 bit address space to which the 32 bit program is originally designed to be allocated. As a consequence, in this third embodiment, it is necessary to carry out the context switching operation only in a case of switching the execution from one 32 bit program to another 32 bit program.

Also, the OS has a program management table shown in FIG. 19, which indicates a state of each program along with a root pointer value for identifying the page table in the page table unit 216 appropriate for each program. Although not shown in FIG. 19, the program management table may also contain the context for each program saved at a time of a past execution of each program.

Figure 20:
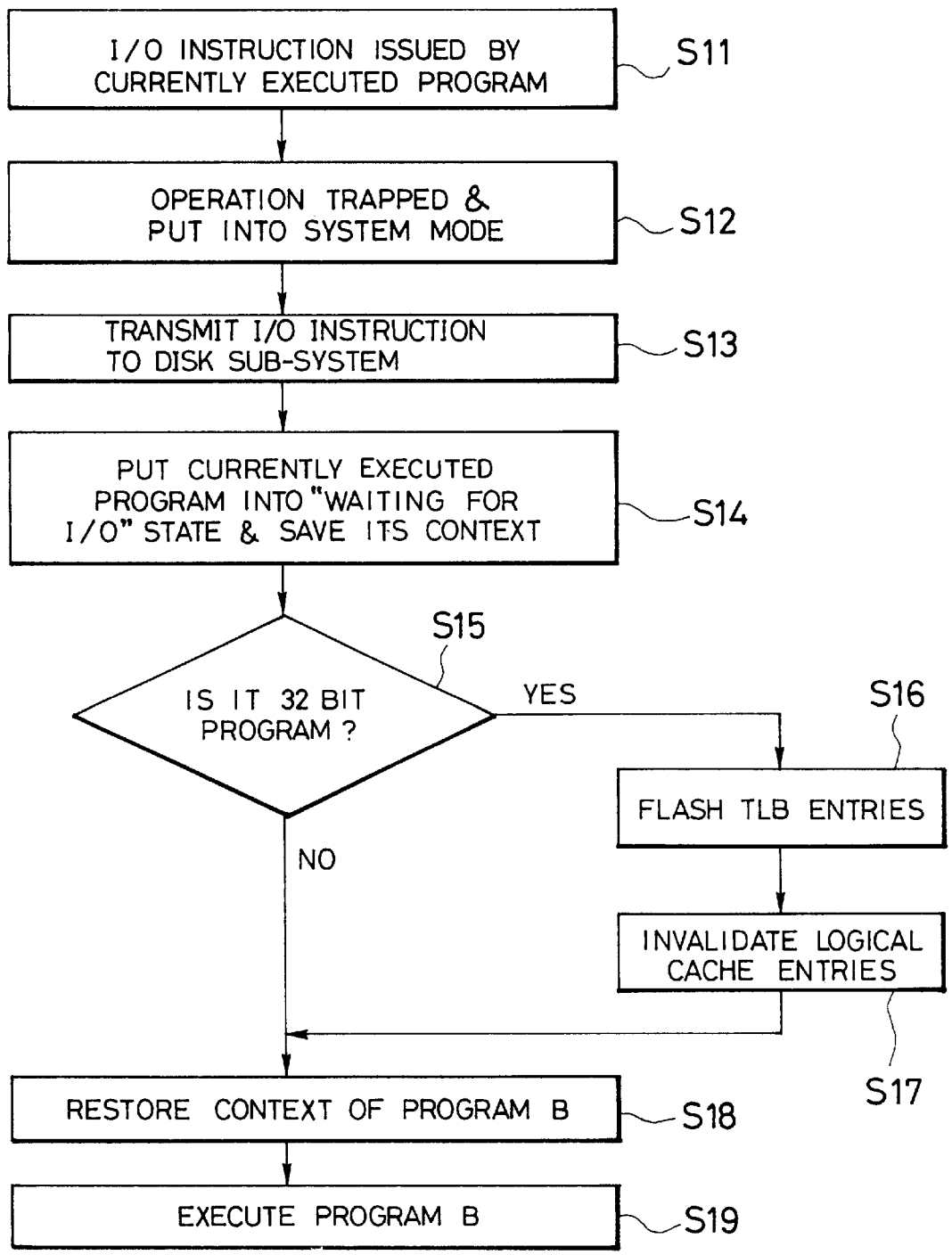
FIG. 20 is a flow chart of the context switching operation to be carried out in the hardware configuration of FIG. 17.

In this third embodiment, the context switching is carried out according to the flow chart of FIG. 20 as follows.

First, at the step S11, the currently executed program issues a system call including an input and output instruction with respect to the disk sub-system 217, such that the execution stops.

In response, next at the step S12, the operation is trapped and the operation mode is switched to a system mode, and at the step S13, the input and output instruction is transmitted to the disk sub-system 217.

Then, at the step S14, as it takes some time until the response comes from the disk sub-system 217, the currently executed program is put into "waiting for I/O" state, and the context of the currently executed program is saved.

At this point, the program that can be executed next is searched, and in the following, a case in which the 32 bit program B is selected for the program to be executed next will be described as an example.

In this case, the time required for the context switching is different for the 32 bit program and the 64 bit program, so that next at the step S15, whether the currently executed program is a 32 bit program or a 64 bit program is determined.

In a case the currently executed program is a 32 bit program such as the program A, because the virtual addresses are overlapping between the programs A and B, next at the step S16, the entries of the TLB 202 are flashed, and at the step S17, the entries of the logical cache 214 are invalidated, in order to maintain the consistency in the TLB 202 and the logical cache 214. In this case, the overhead due to the context switching is the same as that required in a conventional case so that it is tolerable.

Then, next at the step S18, the context of the program B to be executed next is restored, and finally at the step S19, the program B is executed.

On the other hand, in a case the currently executed program is a 64 bit program, because there is no overlap in the virtual addresses, there is no need for carrying out an operation to maintain the consistency in the TLB 202 and the logical cache 214. Consequently, in this case the restoring of the context of the program B at the step S18 and the execution of the program B at the step S19 can be taken up immediately after the step S15, such that the time required for the context switching can be reduced considerably.

It is to be noted here that in a case of switching the execution from a 64 bit program, there is no need for the context switching operation because the 64 bit address space uses the single virtual memory scheme.

It is also to be noted that the operation according to the flow chart of FIG. 20 as described above may be modified as follows.

Namely, the flashing of the entries of the TLB 202 at the step S16, and the invalidation of the entries of the logical cache 214 at the step S17 can be carried out at a time of the context switching by the OS according to the program management table, regardless of whether the currently executed program that has been stopped is the 32 bit program or the 64 bit program, only when the program to be executed next is the 32 bit program and the compatible mode address region is occupied by another 32 bit program waiting for further execution. In this case, at the step S18, the restoring of the program to be executed next is carried out after the context of another 32 bit program occupying the compatible mode address region is saved. Otherwise, the OS carries out the context switching without the flashing of the entries of the TLB 202 and the invalidation of the entries of the logical cache 214. Here, the compatible mode address region is emptied by the OS only when the execution of the 32 bit program is completed, in which case the flashing of the entries of the TLB 202 and the invalidation of the entries of the logical cache 214 are also carried out.

As described, in this third embodiment, it becomes possible to provide a method for managing virtual address space in which a plurality of programs designed for the multiple virtual memory scheme can be collectively allocated to a single virtual address space efficiently, without requiring any change in the programs themselves.

Moreover, a considerable reduction of the time required for executing multiple programs can be achieved in this third embodiment because the time consuming context switching operation is required only in a case of switching the execution from one 32 bit program to another 32 bit program.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of managing virtual address space, comprising the steps of:
   (a) allocating a plurality of first type programs designed to be allocated to a plurality of first type address spaces to a second type address space having a size larger than that of each first type address space, collectively in a single virtual memory scheme, without any overlap in virtual addresses, each of the first type programs being distinct from second type programs designed to be allocated to the second type address space;
   (b) registering an address base for one of the first type programs to be executed, the address base specifying appropriate upper bits of the virtual addresses according to the single virtual memory scheme for a region of the second type address space to which said one of the first type programs is allocated at the step (a); and
   (c) calculating effective addresses according to the single virtual memory scheme to be used during an execution of said one of the first type programs by setting the address base for said one of the first type programs registered at the step (b) as upper bits of the effective addresses while setting lower bits of the virtual addresses according to the single virtual memory scheme for a region of the second type address space to which said one of the first type programs is allocated as lower bits of the effective addresses.

2. The method of claim 1, further comprising the step of:
   (d) providing an indicator for indicating a currently executed program as either one of a first type program and a second type program, such that the steps (b) and (c) are carried out only when the indicator indicates the currently executed program as the first type program.

3. The method of claim 2, wherein at the step (a), at least one of the second type programs is also allocated to the second type address space along with the plurality of the first type programs, and which further comprises the step of:
   (e) when the indicator provided at the step (d) indicates the currently executed program as the second type program, using the virtual addresses for a region of the second type address space to which the currently executed program which is the second type program is allocated at the step (a) as effective address to be used during an execution of the currently executed program.

4. The method of claim 2, wherein at the step (d), the indicator is provided as a flag in a register for indicating a current state of a processor for executing the first and second type programs or a memory management unit for managing the second type address space.

5. The method of claim 2, wherein at the step (b), the address base is registered in an address base register, and wherein at the step (d), the indicator indicates a validity of the address base register registering the address base for the currently executed program.

6. The method of claim 1, further comprising the step of:
   determining a currently executed program as either one of a first type program and a second type program, according to an instruction field of an address control instruction encountered during an execution of the currently executed program, such that the steps (b) and (c) are carried out only when the currently executed program is determined to be the first type program.

7. The method of claim 6, wherein at the step (b), the address base is registered in an address base register which is valid only when the currently executed program is determined to be the first type program.

8. The method of claim 6, wherein at the step (a), at least one of the second type programs is also allocated to the second type address space along with the plurality of the first type programs, and which further comprises the step of:
   when the currently executed program is determined to be the second type program, using the virtual addresses for a region of the second type addresses space to which the currently executed program which is the second type program is allocated at the step (a) as effective address to be used during an execution of the currently executed program.

9. A method of managing virtual address space, comprising the steps of:
   (a) allocating a plurality of first type programs designed to be allocated to a plurality of first type address spaces and at least one second type program designed to be allocated to a second type address space having a size larger than that of each first type address space, to the second type address space collectively in a single virtual memory scheme, without any overlap in virtual addresses, each of the first type programs being distinct from second type programs designed to be allocated to the second type address space;
   (b) determining a currently executed program as either one of a first type program and a second type program, according to an instruction field of an address control instruction encountered during an execution of the currently executed program; and
   (c) when the currently executed program is determined to be the first type program at the step (b), calculating effective addresses according to the single virtual memory scheme to be used during an execution of the currently executed program by setting upper bits of a starting address according to the single virtual memory scheme of the currently executed program in the second type address space as upper bits of the effective addresses while setting lower bits of the virtual addresses according to the single virtual memory scheme for a region of the second type address space to which the currently executed program is allocated at the step (a) as lower bits of the effective addresses.

10. The method of claim 9, wherein at the step (c), each of the effective addresses is calculated from the starting address by fixing the upper bits so as to retain the upper bits of the starting address and changing the lower bits to an appropriate one of the virtual addresses for a region of the second type address space to which the currently executed program is allocated at the step (a).

11. The method of claim 9, further comprising the step of:
   (d) when the currently executed program is determined to be the second type program at the step (b), using the virtual addresses for a region of the second type address space to which the currently executed program which is the second type program is allocated at the step (a) as effective addresses to be used during an execution of the currently executed program.

12. A method of managing virtual address space, comprising the steps of:

(a) allocating a plurality of first type programs designed to be allocated to a plurality of first type address spaces and at least one second type program designed to be allocated to a second type address space having a size larger than that of each first type address space, to the second type address space collectively in a single virtual memory scheme, without any overlap in virtual addresses, each of the first type programs being distinct from second type programs designed to be allocated to the second type address space;

(b) providing an indicator for indicating a currently executed program as either one of a first type program and a second type program; and (c) when the currently executed program is indicated to be the first type program by the indicator provided at the step (b), calculating effective addresses according to the single virtual memory scheme to be used during an execution of the currently executed program by setting upper bits of a starting address according to the single virtual memory scheme of the currently executed program in the second type address space as upper bits of the effective addresses while setting lower bits of the virtual addresses according to the single virtual memory scheme for a region of the second type address space to which the currently executed program is allocated at the step (a) as lower bits of the effective addresses.

13. The method of claim 12, wherein at the step (c), each of the effective addresses is calculated from the starting address by fixing the upper bits so as to retain the upper bits of the starting address and changing the lower bits to an appropriate one of the virtual addresses for a region of the second type address space to which the currently executed program is allocated at the step (a).

14. The method of claim 12, further comprising the step of:

(d) when the currently executed program is indicated to be the second type program by the indicator provided at the step (b), using the virtual addresses for a region of the second type address space to which the currently executed program which is the second type program is allocated at the step (a) as effective addresses to be used during an execution of the currently executed program.

15. The method of claim 12, wherein at the step (b), the indicator is provided as a flag in a register for indicating a current state of a processor for executing the first and second type programs or a memory management unit for managing the second type address space.

16. A method of managing virtual address space, comprising the steps of:

(a) allocating a plurality of first type programs designed to be allocated to a plurality of first type address spaces to a second type address space having a size larger than that of each first type address space, collectively in a single virtual memory scheme, without any overlap in virtual addresses, each of the first type programs being distinct from second type programs designed to be allocated to the second type address space;

(b) providing a compatible mode address region to be used in executing one of the first type programs in the second type address space, to which no program is permanently allocated and which has virtual addresses according to the single virtual memory scheme identical to those to which each of the first type programs is designed to be allocated in each of the first type address spaces; and (c) executing one of the first type programs by temporarily setting said one of the first type programs to be executed to the compatible mode address region in the second type address space provided at the step (b) during an execution of said one of the first type programs.

17. The method of claim 16, wherein at the step (c), the execution of said one of the first type programs utilizes at least one cache device, and which further comprises the step of:

(d) carrying out a context switching operation for maintaining a consistency in said at least one cache device, when an execution of said one of the first type programs is stopped.

18. The method of claim 16, wherein at the step (c), the execution of said one of the first type programs utilizes at least one cache device, and which further comprises the step of:

(d) carrying out a context switching operation for maintaining a consistency in said at least one cache device, when an execution of a currently executed program is stopped, only in a case in which said one of the first type programs is to be executed next and another one of the first type programs is already temporarily set to the compatible mode address region in the second type address space provided at the step (b).

19. The method of claim 16, further comprising the steps of:

executing one of the second type programs using the virtual addresses for a region of the second type address space to which said one of the second type programs is allocated at the step (a) as effective addresses to be used during an execution of said one of the second type programs.

* * * * *